United States Patent [19]

Johnson

[11] Patent Number: 4,863,602

[45] Date of Patent: Sep. 5, 1989

[54] FLEXIBLE FILTER ELEMENT EMPLOYING FILTERING SHEETS FORMED WITH BYPASS OPENINGS

[75] Inventor: Todd W. Johnson, Minneapolis, Minn.

[73] Assignee: Minnesota Mining and Manufacturing Company, St. Paul, Minn.

[21] Appl. No.: 95,440

[22] Filed: Aug. 31, 1987

[51] Int. Cl.$^4$ .................... B01D 27/04; B01D 27/06
[52] U.S. Cl. .................................. 210/484; 210/485; 210/489; 210/493.5; 210/494.1; 210/497.2; 210/503; 55/158; 55/446; 55/485; 55/486; 55/500; 55/527
[58] Field of Search ........... 210/488, 489, 492, 321.72, 210/321.73, 321.74, 321.75, 321.77, 321.78, 321.82, 321.83, 321.84, 321.86, 321.87, 483, 484, 485, 493.1, 493.5, 494.1, 497.01, 503, 497.2, 158, 446; 55/482, 484, 485, 486, 487, 497, 498, 500, 521, 527

[56] References Cited

U.S. PATENT DOCUMENTS

| | | | |
|---|---|---|---|
| 2,774,127 | 12/1956 | Secrist | 210/492 |
| 3,279,615 | 10/1966 | Stokes | 210/488 |
| 4,126,560 | 11/1978 | Marcus et al. | 210/492 |
| 4,172,797 | 10/1979 | Robichaud et al. | 210/492 |
| 4,555,342 | 11/1985 | Grant | 210/488 |
| 4,629,569 | 12/1986 | Gimbel | 210/488 |
| 4,799,944 | 1/1989 | Dixon et al. | 55/446 |

Primary Examiner—Richard V. Fisher
Assistant Examiner—Wanda L. Millard
Attorney, Agent, or Firm—Donald M. Sell; David W. Anderson

[57] ABSTRACT

Disposable filter element, adapted for use in a high-pressure filter housing, has a plurality of layers of flexible filtering material, some layers being formed with openings through which a portion of the fluid can flow without being filtered, and at least one downstream layer of the filtering material being free from such openings. When all of the layers of filtering material have the same pore size, the total area of the openings in each layer is larger than that of the openings of any downstream layer. Each opening-containing layer of the filtering material removes part of the contaminant in the fluid. Interposed between adjacent opening-containing filtering layers is a layer of flexible transport material, and there is a layer of flexible prefiltering material positioned upstream of said filtering layers. The prefiltering material has a porosity to filter out from the fluid any particle that is substantially as large as the openings of the most upstream of the filtering layers to guard against an opening becoming blocked by such a particle.

17 Claims, 3 Drawing Sheets

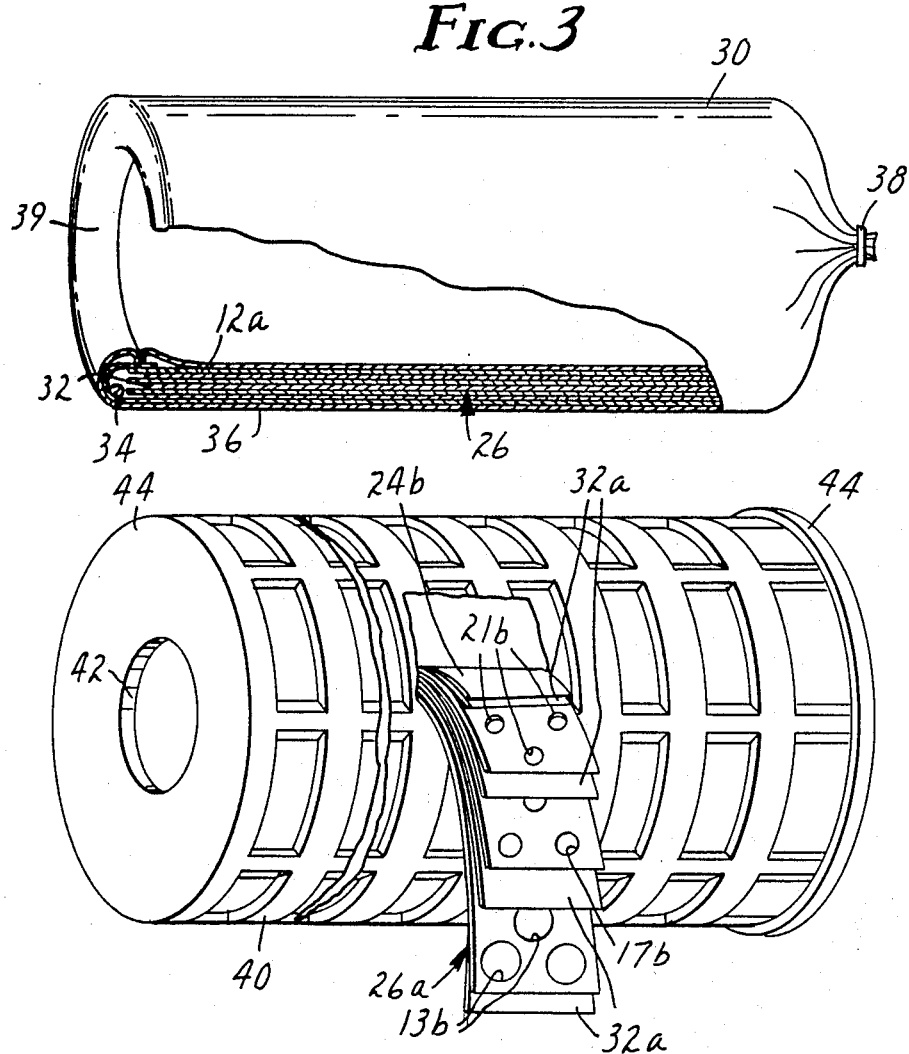

FLEXIBLE FILTER ELEMENT EMPLOYING FILTERING SHEETS FORMED WITH BYPASS OPENINGS

CROSS-REFERENCE TO RELATED APPLICATION

The flexible filter element of this invention is particularly useful for making the flexible filter bag which is the subject of a copending application entitled "Flexible Filter Bag and Method of Fabrication" filed of even date herewith (Ser. No. 07/095,441 Attorneys' File No. 42489 USA 1A) which remains pending.

BACKGROUND ART

1. Field of the Invention

The invention concerns a filter element, particularly one intended for use in removing contaminating particles from a fluid. The invention also concerns filter elements which can be put to such diverse uses as the removal of water from oil, the catalysis of a liquid, the removal of color from a liquid, or the chlorination of water 2. Description of the Related Art Filter elements often employ a plurality of layers of filtering material, thus prolonging their useful life by collecting only a portion of contaminant at each layer. If the layers are identical, most of the contaminant will be collected at the upstream layer. To counteract this, some filter elements incorporate a gradient density such as is provided by a stack of filtering fabrics of progressively reduced pore size so that larger particles are collected by upstream layers while smaller particle are collected by downstream layers. See, for example, Thomas U.S. Pat. No. 3,003,643. When the contaminant has a broad size distribution, such a filter element gives good depth loading performance and hence has a long useful life. However, when the contaminant size distribution is narrow, it is primarily collected within a thin zone so that the filter element becomes clogged or otherwise ineffective even though most the depth of the filter element remains relatively free from contaminant.

Japanese patent Application No. JA57-11264, which was laid open July 30, 1983 (Publication No. JA58-128121), shows a filter element formed by winding a long strip of filter paper on itself. The filter paper is formed with a large number of small holes which are arranged so that the holes in any convolution do not coincide with the holes of adjacent convolutions. The application says that part of the oil being filtered passes through the holes, and the other part passes through the portion of the filter paper between the holes, whereby less fluid loss may be achieved.

Gimbel, U.S. Pat. No. 4,629,569 shows a device called a "depth filter" to be substituted for a gravity-driven granular bed such as is commonly used for the treatment of water. Gimbel's depth filter consists of "permeable, thin membrane layers which are disposed at small mutual spacings of for example approximately 0.5–10 mm, preferably 1–5 mm. In order to insure depth action of the filter larger circular or disk-shaped holes, so called macroholes of, for example 0.1 to 5 mm are provided in these membrane layers at predetermined spacings; through these holes the major portion of the liquid throughput continues to flow largely unimpeded—even after a long period of filter operation . . . Preferably, the macroholes are made smaller, continuously or step-wise, in the individual layers in the principal flow direction" (col. 2, lines 1–37). In order to maintain the aforementioned spacing of "large-area membrane layers, it may be necessary to insure the horizontal attitude of the membrane layers by the installation of suitable support elements between the individual layers. As a matter of principle however it is also possible to provide the membrane filter surfaces in suitable frames which then are combined, side by side, to form larger filter surfaces in order to avoid the sagging of the membrane filter layers" (col. 5, lines 41–49).

OTHER RELATED ART

Ludwa et al. U.S. Pat. No. 4,276,338 shows a two-layer absorbent cloth such as a wiping fabric which is said to provide improved wicking because each layer has a pattern of multiple discrete holes or regions of low density which are separated by regions of high density. The two layers are so aligned that open or low density areas of one layer do not substantially overlap those of the other layer.

SUMMARY OF THE INVENTION

The invention provides a disposable filter element which when used in a high-pressure filter housing is believed to remove far more contaminant from a fluid before becoming clogged than can any prior filter element of equal volume and substantially equal cost. Briefly, the novel disposable filter element is made up of (1) a plurality of layers of flexible, fluid-permeable filtering material, of which (a) at least one layer is formed with at least one opening through which a portion of the fluid can flow without being filtered, and (b) a downstream layer is free from such openings, (2) a layer of flexible, fluid-permeable, substantially-nonfiltering transport material immediately downstream of each opening-containing filtering layer, which transport material offers little resistance to the lateral flow of the fluid, and (3) a layer of flexible prefiltering material positioned upstream of said plurality of layers of filtering material, the porosity of the prefiltering material being selected to filter out from the fluid substantially all particles that could otherwise become lodged in the transport material but not to filter out significantly smaller particles.

The effect of the openings in combination with the transport material is to distribute the collected contaminant fairly equally in the various layers of filtering material, thus increasing the loading capacity and prolonging the useful life of the filter element.

Any of said opening-containing filtering layers preferably is formed with a large number of uniformly distributed openings of substantially equal size. Preferably the novel filter element has at least three opening-containing filtering layers. The total area of the openings in any of those filtering layers should be larger than that of any downstream filtering layer, and the openings in each filtering layer preferably are offset from openings in adjacent filtering layers. Unless the edges of the layers of filtering fabric are sealed (either by being fused or by being clamped by a filtering apparatus), there preferably are several layers of filtering fabric which are free from such openings and are positioned downstream of the filtering layers that have such openings, thus guarding against contamination of the filtered fluid by possible leakage around the edges of one or more of the opening-free layers.

Ideally, the bypassing provided by the openings results in each opening-containing filtering layer collecting approximately equal amounts of contaminant, thus affording the longest possible life to the filter element. When a filter element of the invention contains n layers of filtering material formed with openings, ideally $100/(n+1)$ % of unfiltered fluid arrives at each of the opening-containing filtering layers and the upstreammost layer that is free from the openings. Excellent results have been obtained with nine layers of filtering material, each formed with openings larger than those of any downstream layer of filtering material, followed by 10-15 layers of filtering material that are free from such openings. When so constructed, the efficiency in particle removal of the novel filter element increases over its useful life.

Preferably, each of said openings is a perforation that substantially forms a circle, thus permitting the opening to be large enough to provide the desired bypassing effect without unduly weakening the filtering layer. Useful openings can also be provided by slits or openings of other shapes or by using one or more layers of filtering material that do not quite reach an edge of the filter element.

Each layer of transport material immediately downstream of an opening-containing filtering layer functions to commingle unfiltered fluid passing through those openings with fluid that has been filtered by that filtering layer and to distribute the commingled fluids as uniformly as possible over the upstream surface of the next layer of filtering material. In order to perform this commingling and distribution, the transport material offers little resistance to the lateral flow of fluid. However, it does present some resistance, and until its resistance has been empirically evaluated under use conditions, the number and size of openings in the filtering layers cannot be optimized.

Upon newly designing a filter element of the invention, it is suggested that initial experimentation employ only two filtering layers, one formed with openings and the other imperforate. After a test to remove contaminant, the filter element is opened to check visually whether the opening-containing filtering layer has removed more or less contaminant than the imperforate filtering layer, after which the total area of the openings is adjusted so that the two filtering layers will remove substantially equal amounts of contaminant. Subsequently, a filter element containing the desired number of filtering layers is made, tested and then laid open for visual examination as to whether the opening-containing layers have collected approximately equal amounts of contaminant. If the distribution is not approximately the same at each filtering layer, the relative sizes or numbers of the openings is adjusted to make those amounts more equal.

As noted above, the layer of prefiltering material should filter out relatively large particles, because if a particle were to become lodged in a layer of transport material, that probably would occur immediately downstream of an opening in a filtering layer, thus blocking the flow of fluid through that opening. Excellent results have been realized when the prefiltering material has been identical to the transport material.

When the filter element of the invention is to be fitted into a cylindrical filter basket, the filter element may be made by convolutely winding a long strip of filtering fabric which has relatively large perforations in its most upstream convolution and progressively smaller perforations in each successive convolution of the filtering fabric, with the last several convolutions being free from such openings. That strip may be convolutely wound together with transport material of a length sufficient to cover the most downstream convolution of perforated filtering fabric.

When a filter element of fine pore size is desired, a preferred filtering fabric is made of blown microfibers. Especially useful are blown polypropylene microfibers which are economical, provide excellent filtering, and can be fused under pressure at ordinary room temperatures. The latter property is advantageous in making the flexible filter bag disclosed in the application cited in the first paragraph of this application.

When a filter element of relatively large pore size is desired, a preferred filtering fabric is a coarse-fiber web such as spunbonded nonwovens or felts. To attain the finest pore size, the filtering fabric may be a membrane material.

THE DRAWING

The invention may be more easily understood in reference to the drawing, all figures of which are schematic. In the drawing:

FIG. 3 is a perspective view of a disposable flexible filter bag constructed from a strip of the filtering material of FIG. 2, broken away in part.

FIG. 4 is a perspective view of disposable filter cartridge made from a strip of filtering material identical to that of FIG. 2, broken away to expose the filtering material.

Figure 1:
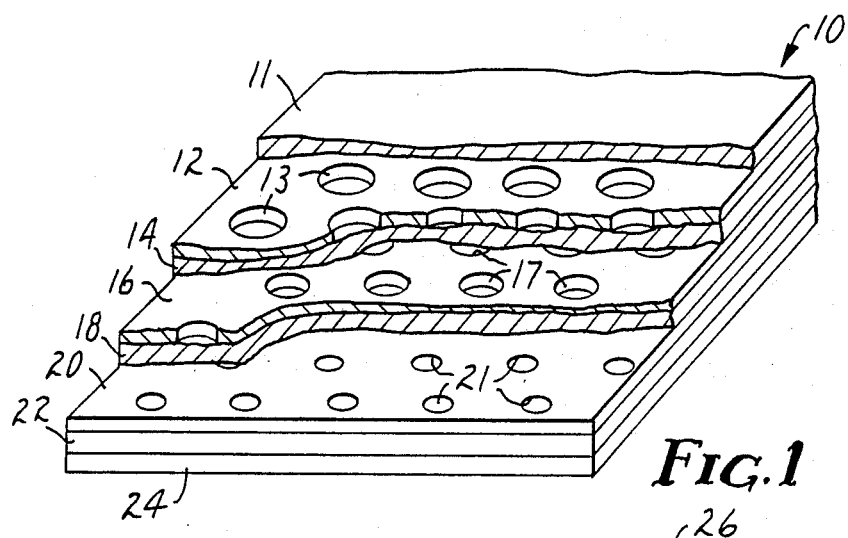
FIG. 1 is a perspective view of a disposable filter element of the invention, portions of which are broken away to reveal details of construction.

The filter element 10 shown in FIG. 1 is made up of the following layers listed in sequence from upstream toward downstream:

a flexible prefiltering layer 11, a first or most upstream flexible layer 12 of filtering material formed with a plurality of circular perforations 13 of substantially uniform size, a first flexible transport layer 14 which is identical to the prefiltering layer 11, a second flexible filtering layer 16 formed with a plurality of circular perforations 17, each smaller than one of the perforations 13, a second transport layer 18 which is identical to the first transport layer 14, a third flexible filtering layer 20 formed with a plurality of circular perforations 21, each smaller than one of the perforations 17, a third flexible transport layer 22, and a fourth or downstream flexible filtering layer 24 which is free from openings of the nature of perforations 13, 17 and 21.

Figure 2:
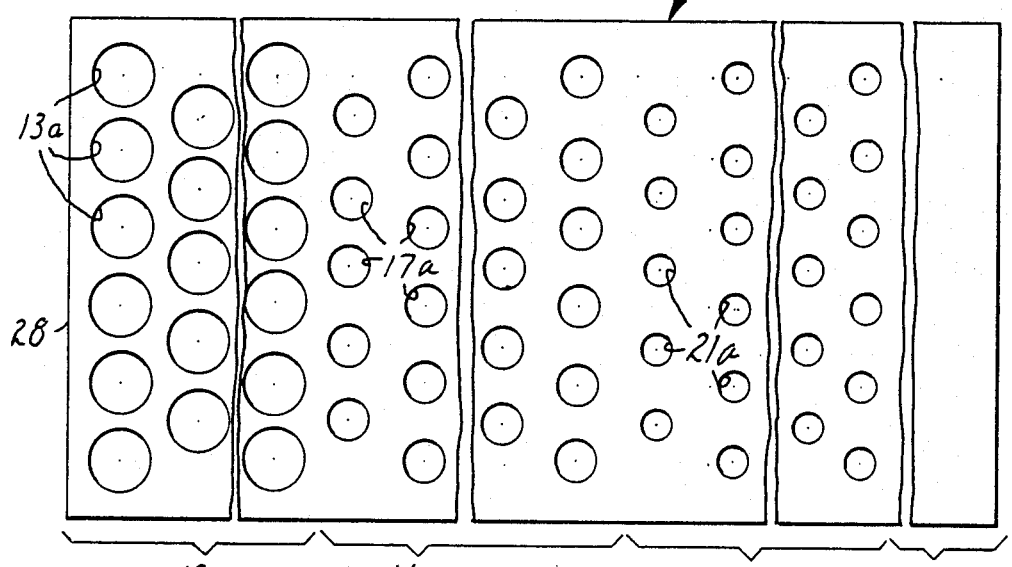
FIG. 2 is a plan view of a strip of filtering material useful for making a tubular disposable filter element of the invention.

The flexible filtering material of the strip 26 shown in FIG. 2 can be identical to that used for the filtering layers 12, 16, 20 and 24 but is designed to be wound convolutely with a transport material to form a cylindrical filter element. One end 12a of the strip 26 beginning at its leading edge 28 is formed with circular perforations 13a on a triangular hole pattern. Then beginning a distance from the leading edge 28 approximately equal to one circumference of the intended cylindrical filter element and extending to twice that distance, a segment 16a of the strip is formed with a plurality of circular perforations 17a, each smaller than one of the perforations 13a; while over the distance between approximately two and three times the circumference, a segment 20a of the strip 26 is formed with circular perforations 21a, each smaller than one of the perforations 17a. Beyond a distance from the leading edge 28 to approximately three times the circumference, a segment 24a of the strip 26 is free from perforations and is longer than one circumference to ensure that the fluid is completely filtered.

As seen in FIG. 3, the strip 26 of FIG. 2 can be formed into a flexible tubular filter bag 30 such as that disclosed in the application cited in the first paragraph of this application, which disclosure is incorporated here by reference. To make the filter bag 30, the strip 26, starting with its leading edge 28, is wound upon a cylindrical mandrel (not shown) together with a strip of transport material 32 to form a tube. After removing the tube from the mandrel, one end of the tube is folded inwardly around a thin rigid ring 34 to form a cuff. A flexible, fluid-permeable sleeve 36 extends around the cuff and covers both the inner and outer faces of the tube. The other end of the tube and the outer portion of the sleeve are gathered and compressed to form a seal that is reinforced by a clamp 38. Liquid fed through the open end 39 of the bag 30 is filtered as it flows radially outward through the layers of filtering material.

As shown in FIG. 4, a strip of perforated filtering material (like the strip 26 of FIG. 2) can be convolutely wound with a strip of transport material 32a to form a tube that is inserted into a cylindrical cage 40. The resulting cartridge receives fluid through its circumferential surface to exit through an axial aperture 42 in one or both of its end caps 44. Accordingly, the outermost convolution of the strip of filtering material is formed with the largest perforations 13b, the next convolution has smaller perforations 17b, and the third convolution of filtering material has still smaller perforations 21b. Radially inward of the third convolution of filtering material is at least one convolution of imperforate filtering material 24b.

Instead of inserting convolutely wound strips as shown in FIG. 4, the cylindrical cage 40 can be used to encase filtering and transport layers which have been pleated.

Figure 5:
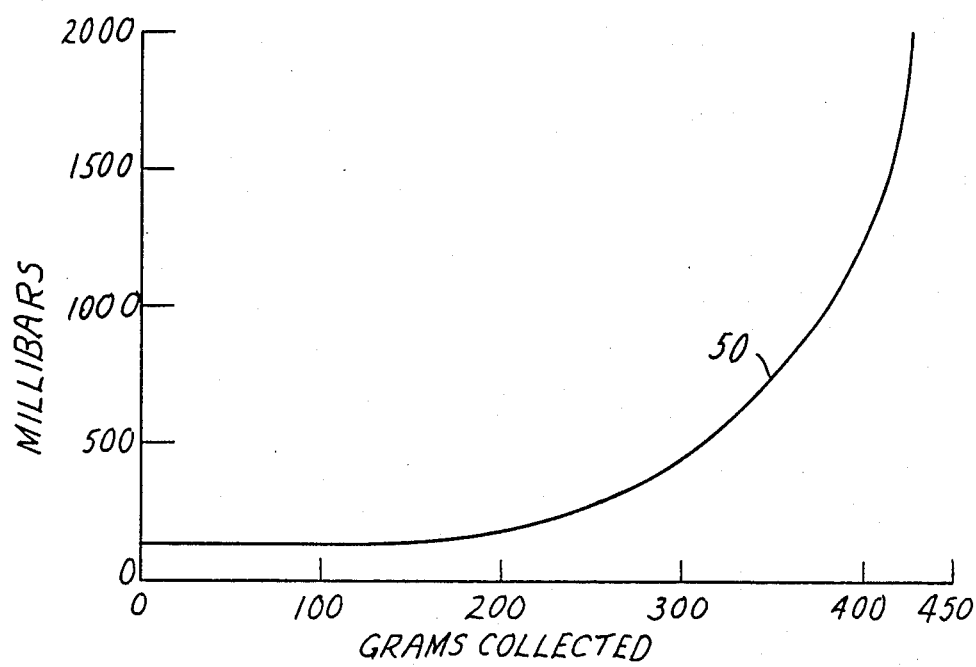
FIG. 5 is a graph of the pressure drop across a filter element of the invention made as shown in FIG. 3 and described in Example 1 and used to filter contaminated water.

The curve of FIG. 5 shows that in use, a filter element of the invention can collect a considerable quantity of contaminant before there is any change in the pressure drop and can become almost saturated with contaminant before there is an appreciable increase in pressure drop. Rapidly rising pressure drop signals that the filter element should be changed.

EXAMPLE 1

The following materials were used to construct a flexible filter bag as illustrated in FIG. 3 of the drawing.

Filtering Fabric

A polypropylene blown-microfiber (BMF) web having a basis weight of approximately 20 g/m$^2$, a thickness of approximately 0.04 cm, a solidity of approximately 5%, and an equivalent pore size of about 5 μm prepared according to the process described in Wente, Van A., "Superfine Thermoplastic Fibers", *Industrial Engineering Chemistry*, Vol. 48, pp. 1342-1346 and in Wente, Van A. et al., "Manufacture of Superfine Organic Fibers", Report No. 4364 of the Naval Research Laboratories, published May 25, 1954. [Equivalent pore size was determined as described in 3M Publication No. 70-0701-2170-S, Product Bulletin #1 entitled "Micron Rating and Efficiency".]

Transport Material and Prefiltering Fabric

"Fibretex" 150, a 150 g/m$^2$ basis weight, needletacked polypropylene spunbond web available from James River Corp., Greenville, S.C., which has an average fiber size of approximately 2-3 denier, a solidity of approximately 13%, and a thickness of about 2.5 mm.

Cover of the Sleeve

"Celestra", a spunbond, pin-bonded polypropylene fabric having a basis weight of approximately 34 g/m$^2$, a thickness of about 0.025 cm, an equivalent pore size of about 20 μm, and a solidity of about 15%, which is available from James River Corp.

A first strip of the filtering fabric (about 424 cm × 94 cm) having one trimmed edge was drilled to produce a series of circular perforation patterns, each on 10.2 cm triangular centers. The sizes of the perforations in each pattern decreased from one end of the strip to the other. The centers of the leading perforations of each pattern were offset 5.1 cm laterally and 5.1 cm longitudinally from the centers of the trailing perforations of the preceding pattern. The length of each pattern from the centers of its leading to its trailing perforations is reported in Table I together with the diameter of its perforations.

TABLE I

| Pattern # | Pattern Length (cm) | Hole Size (mm) |
| --- | --- | --- |
| 1 | 44.5 | 54 |
| 2 | 40.5 | 48 |
| 3 | 40 | 42 |
| 4 | 39.5 | 36 |
| 5 | 49.5 | 30 |
| 6 | 49 | 24 |
| 7 | 41.5 | 18 |
| 8 | 47.5 | 12 |
| 9 | 72 | 6 |

The flexible filter bag was made as disclosed in the application cited in the first paragraph of this application by first laying a strip of the transport material (424 cm × 61 cm) on a flat surface, then positioning the perforated first strip of the filtering fabric (424 × 94 cm) over the transport material such that a trimmed longitudinal edge of the perforated filtering fabric extended 5 cm beyond the corresponding edge of the transport material. The leading edge of the filtering fabric extended about 2.5 cm beyond the leading edge of the transport material. The perforation patterns of the filtering fabric approximately extended to a width coinciding with the width of the transport layer. These were then wrapped around a 13.65 cm diameter (42.9 cm circumference) cylindrical mandrel beginning with the leading edge of the perforated first strip of the filtering fabric. An imperforate second strip of the filtering fabric (1080 cm × 102 cm) was placed on a flat surface, and the wrapped mandrel placed on it such that the leading edge of the imperforate filtering fabric overlapped the trailing edge of the transport material by 5 cm. One longitudinal edge of the imperforate filtering fabric extended about 13 cm beyond the trimmed edge of the perforated filtering fabric. The imperforate second strip of the filtering fabric was then wrapped over the previously wrapped construction, and the resulting tube was removed from the mandrel. A stainless steel ring (18 cm in diameter and having a cross-sectional diameter of 0.25 cm) was fitted approximately 7.6 cm into the end of the tube, and the extending convolutions of the imperforate filtering fabric were folded inwardly over the ring to form a cuff.

A sleeve was made so that its cover portion was approximately 19.5 cm in diameter and 100 cm in length and its prefiltering fabric portion was approximately 14 cm in diameter and 60 cm in length. The cover and prefiltering fabric portions had longitudinal seams and were joined at a circumferential seam, the seams being made with polypropylene thread. The prefiltering fabric portion of the sleeve was inserted into the tube until the circumferential seam faced the inside of the tube close to the ring. The cover portion was folded over the ring and pulled over the outside of the tube. The free ends of the cover and the filtering fabrics at the ring-free end of the tube (but not the prefiltering fabric portion of the sleeve or the transport material) were then inserted into an approximately 1.6 cm diameter compression die. A pressure of 600 to 1000 bar was applied to the die at ambient temperature, thus sealing the ends of the tube and sleeve to provide a flexible filter bag as shown in FIG. 3 of the drawing of the present application. The seal was approximately 2.5 cm in length, and the material beyond the seal was trimmed off. Continuity of the seal was ensured by securing it with a #198R metal clamp available from the Oetiker Co., Livingston, N.J. The finished bag as shown in FIG. 3 was about 81 cm in length.

Performance of the flexible filter bag was established by placing it in a high-pressure filter vessel and evaluating its ability to remove a controlled particulate slurry from a challenge flow of water. The pressure filter vessel was Model S-122 from Filtration Systems Corp., West Babylon, N.Y. which is representative of vessels currently being used for filtering liquids with flexible filter bags. The particulate slurry was a suspension of AC Fine Air Cleaner Test Dust (available from A. C. Spark Plug Division, General Motors Corp., Flint, MI) at a concentration of 2.6 g per liter, which was introduced into the challenge flow upstream of the test filter bag at a rate of about 7.5 liters per minute. The challenge flow consisted of a recirculating volume of about 450 liters which was maintained at a flow rate of 94 liters per minute. The filtrate emerging from the filter housing was directed to a holding tank, from which it was recirculated. The pressure drop across the filter bag was monitored, and the test was terminated when the system attained a pressure of 2000 millibars, whereupon the loading of collected contaminant was calculated to be 450 grams.

After the test, the bag was cut open and unwound. Visual examination indicated that each of the perforated filtering layers and the upstream-most imperforate filtering layer had collected substantially equal amounts of contaminant.

Similar testing of commercially available flexible filter bags of comparable efficiency and size demonstrated loading capacities of less than 100 grams under these test conditions.

Efficiency was determined as described in the above-cited 3M Product Bulletin #1 except at a controlled flow rate of 10 gallons (38 liters) per minute. Average results of seven test bags are reported in Table II.

TABLE II

| Efficiency at: | Particle Size | | |
|---|---|---|---|
| | 5 μm | 10 μm | 16 μm |
| Average of 7 bags: | 95.0% | 99.6% | 99.9% |

While the filter element of the bag of Example 1 utilized filtering material having the same pore size throughout the filter bag, it may be preferred to utilize filtering materials of progressively decreasing pore sizes from upstream to downstream layers.

EXAMPLE 2

As is pointed out hereinabove, initial experimentation may employ only two filtering layers, one formed with openings and the other imperforate. Such an experiment was made using water-filtering apparatus consisting of an upstream pressure gauge, a first filter holder ("Millipore" 142 mm diameter flat-sheet filter holder, 123 mm$^2$ active filtering area), a second pressure gauge, and a second filter holder identical to the first. Mounted in the first filter holder were two layers of transport material, one on either side of a single layer of perforated filtering fabric. A single layer of imperforate filtering fabric was mounted in the second filter holder. The filtering fabric was the same as that of Example 1 except having a basis weight of 100 g/m$^2$, an equivalent pore size of 10 μm, and a thickness of 0.20 cm. The transport material was identical to that of Example 1.

A controlled particulate slurry challenge consisting of AC Fine Air Cleaner Test Dust (available from A.C. Spark Plug Division, General Motors Corp., Flint, MI.) at a concentration of about 0.4 g per liter of water was pumped through the test apparatus at a flow rate of one (1) liter per minute. The test was allowed to run until a pressure drop across the test apparatus reached 1000 millibars, at which point the pressure drop across each filter holder was noted. The test apparatus was subsequently disassembled and the loading pattern on both the perforated and imperforate pieces of filter fabric were visually evaluated.

Tests were carried out using three different pieces of perforated filtering fabric, each having a pattern of 2.5 mm circular perforations uniformly distributed over the area of the first filter holder. Test results are reported in Table III.

TABLE III

| Test | Number of Holes | Time of Plugging (minutes) | Majority of Loading |
|---|---|---|---|
| 2A | 4 | 8.5 | First Holder |
| 2B | 6 | 10 | First Holder |
| 2C | 8 | 7.5 | Second Holder |

The shift in loading pattern coupled with the shorter time to load the filter element of Test 2C suggested a preliminary hole-frequency pattern of between six and eight 2.5 mm diameter holes per 123 cm$^2$ for the 10 μm filtering fabric.

Subsequent testing of filter elements of the invention consisting of several layers of perforated filtering fabric alternating with layers of transport material established that a hole distribution pattern of N, 2N, 3N, etc. beginning with the most downstream perforated filtering fabric layer would produce substantially equal loading on all of the layers of perforated filtering fabrics as well as on the most upstream layer of imperforate filtering fabric.

In the above experiments, the total bypass area for each layer of filtering fabric was controlled by varying the number of holes per unit area. An alternative approach to varying the total bypass area for each filtering layer, namely maintaining a constant number of holes in each layer and varying the diameter of those holes, has also been experimentally demonstrated.

The bypass area for an individual perforation can be defined in one of two ways, depending on the size of the perforation. If the perforation, a circle in the above example, has a diameter approximately equal to or smaller than the thickness of the transport layer, the area of the perforation defines the bypass area. However, when the diameter of the perforation is substantially larger than the thickness of the transport layer, the bypass area is defined by the product of the circumference of the circle and the thickness of the transport material.

Table IV summarizes the projected loading and fluid bypass conditions for an optimized filter construction consisting of alternating layers of filtering material and transport material.

TABLE IV

| Layer Number | % Fluid Filtered | % Fluid Bypass | % Expected Share of Total Part. Load | Bypass Area |
|---|---|---|---|---|
| 1[a] | 25 | 75 | 25 | 3X |
| 2 | 33.3 | 66.6 | 25 | 2X |
| 3 | 50 | 50 | 25 | 1X |
| 4 | 100 | 0 | 25 | 0 |

[a] = upstream layer

EXAMPLE 3

A convolutely wound filtering element was made using two filtering fabrics, each having a basis weight of 100 g/m$^2$ and thickness of 0.20 cm and otherwise being identical to that of Example 1 except that the first filtering fabric had an equivalent pore size of 10 $\mu$m while the second filtering fabric had an equivalent pore size of 2.5 $\mu$m. The first filtering fabric (65 cm×148 cm) had two perforated zones, each 48 cm in length and an imperforate zone 52 cm in length. The perforations of the first zone were 5 mm in diameter on 5.9 cm triangular centers and those of the second zone had a pattern of alternating 3 mm and 4 mm diameters, also on 5.9 cm triangular centers. The second filtering fabric (65 cm×115 cm) had a 55 cm first zone having perforations of alternating 3 mm and 4 mm diameters on 5.9 cm triangle centers and a 60 cm second zone having 2.5 mm diameter perforations on 5.9 cm triangular centers.

A strip of transport material (65 cm×270 cm) was laid out on a flat surface, and the first filtering fabric was placed on the transport material such that approximately 2 cm of the trailing edge of the third zone of the first filtering fabric overlapped the leading edge of the first zone of the second filtering fabric and 9 cm of the transport material extended beyond the trailing edge of the second filtering fabric. These were then wrapped on a 13.65 cm diameter (42.9 cm circumference) mandrel, beginning with the end defined by the leading edge of the first zone of the first filtering fabric, to form a tube having a little more than five layers (convolutions) of filtering fabric. After removing the tube from the mandrel, one end of the tube was gathered and fastened with a polypropylene strap. The tube was then inserted into a standard 2.5 $\mu$m flexible filter bag. An aluminum sleeve (12.7 cm in diameter and 7.6 cm wide) was then inserted into the open end of the tube, and the filter bag and insert were cinched against the sleeve by means of a polypropylene band on the outside of the bag.

The resulting filter element of the invention was tested in a high-pressure filtration vessel under conditions identical to those described in Example 1. An average calculated loading capacity of 337 gm was obtained. This compares to an average calculated loading capacity of about 70 gm for the 2.5 $\mu$m filter bag by itself.

When the filter element was disassembled, visual inspection indicated that each of the five convolutions had collected approximately equal amounts of contaminant and about the same amount as was collected at the inner face of the filter bag.

The filtering layers of a flexible filter element of the invention can be replaced by particle-loaded microfiber sheets as described in U.S. Pat. No. 3,971,373 (Braun) to act upon a fluid passing through the flexible filter element. For example, the microfiber sheets can incorporate materials such as water or oil scavengers, decolorizing agents, chlorinating agents or catalysts. Furthermore, a filter element made of layers of filtering material incorporating one or more such agents can have such a function in addition to a filtering function.

I claim:

1. Disposable filter element comprising
   (1) a plurality of layers of flexible, fluid-permeable filtering material, of which (a) at least one layer is formed with at least one opening through which a portion of a fluid can flow without being filtered, and (b) a downstream layer is free from such openings,
   (2) a layer of flexible, fluid-permeable, substantially-nonfiltering transport material immediately downstream of each opening-containing filtering layer, which transport material offers little resistance to the lateral flow of the fluid and
   (3) a layer of flexible prefiltering material positioned upstream of said plurality of layers of filtering material, the porosity of the prefiltering material being selected to filter out from the fluid substantially all particles that could otherwise become lodged in the transport material but not to filter out significantly smaller particles.

2. Disposable filter element as defined in claim 1 wherein each opening-containing filtering layer has a large number of openings of substantially equal size and uniform distribution, and the total area of the openings in each layer of filtering material is larger than that of openings in any downstream layer of filtering material of substantially equal pore size.

3. Disposable filter element as defined in claim 2 wherein each of said openings is a circular perforation.

4. Disposable filter element as defined in claim 3 wherein at least three of said plurality of layers of filtering material are provided with said perforations, the total area of perforations in any filtering layer being larger than that of any downstream layer of said filtering material.

5. Disposable filter element as defined in claim 4 and having about nine layers of filtering material of substantially equal pore size, each provided with perforations larger than those of any downstream layer of said filtering material, followed by 10–15 layers of filtering material that are free from such perforations.

6. Disposable filter element as defined in claim 1 wherein said filtering material is fibrous.

7. Disposable filter element as defined in claim 6 wherein said filtering material comprises blown microfibers.

8. Disposable filter element as defined in claim 7 wherein said blown microfibers comprise polypropylene.

9. A filter comprising a disposable flat filter element as defined in claim 1.

10. A filter comprising a disposable filter element as defined in claim 1 shaped to form a tube, at least one end of which has an axial opening.

11. A filter comprising a disposable filter element as defined in claim 1 mounted in a cylindrical cage.

12. A filter as defined in claim 11, the filter element of which is pleated.

13. A filter as defined in claim 11, the filter element of which is convolutely wound.

14. Disposable filter element comprising
 (1) at least one layer of a first flexible, fluid-permeable filtering material, each layer provided with at least one opening through which a portion of a fluid can flow without being filtered,
 (2) at least one layer of a second flexible, fluid-permeable filtering material, each layer provided with at least one opening through which a portion of a fluid can flow without being filtered, said second material having a pore size smaller than that of the first material and positioned downstream of the first material,
 (3) at least one layer of flexible, fluid-permeable filtering material positioned downstream of said layers of first and second materials, and free of openings through which a portion of a fluid can flow without being filtered,
 (4) a layer of flexible, fluid-permeable, substantially-nonfiltering transport material immediately downstream of such opening-containing filtering layer, which transport material offers little resistance to the lateral flow of the fluid, and
 (5) a layer of flexible prefiltering material positioned upstream of said first filtering material, the porosity of the prefiltering material being selected to filter out from the fluid substantially all particles that could otherwise become lodged in the transport material but not to filter out significantly smaller particles.

15. Disposable filter element as defined in claim 14 wherein each opening-containing filtering layer has a large number of openings of substantially uniform distribution.

16. Disposable filter element as defined in claim 15 wherein each of said openings is a circular perforation.

17. Disposable filter element as defined in claim 16 and having at least two layers of each of said first and second filtering materials, wherein the total area of openings in each filtering layer is larger than that of openings in any downstream layer of filtering material of substantially equal pore size.

* * * * *